United States Patent
Drzymala et al.

(10) Patent No.: US 9,780,580 B1
(45) Date of Patent: Oct. 3, 2017

(54) RECHARGEABLE BATTERY PACK FOR AN ELECTRO-OPTICAL READER, AND METHOD OF CHARGING THE BATTERY PACK AND POWERING THE READER WITH THE CHARGED BATTERY PACK

(71) Applicant: SYMBOL TECHNOLOGIES, LLC, Lincolnshire, IL (US)

(72) Inventors: Mark E. Drzymala, St. James, NY (US); Edward D. Barkan, Miller Place, NY (US); Darran M. Handshaw, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/084,538

(22) Filed: Mar. 30, 2016

(51) Int. Cl.
*H02J 7/00* (2006.01)
*G06K 7/14* (2006.01)
*G06K 7/10* (2006.01)

(52) U.S. Cl.
CPC ........ *H02J 7/0027* (2013.01); *G06K 7/10554* (2013.01); *G06K 7/1413* (2013.01); *G06K 7/1417* (2013.01); *H02J 7/0044* (2013.01); *H02J 7/0052* (2013.01); *G06K 2007/10524* (2013.01); *H02J 2007/0062* (2013.01)

(58) Field of Classification Search
None
See application file for complete search history.

(56) References Cited

U.S. PATENT DOCUMENTS

| | | | | |
|---|---|---|---|---|
| 5,828,966 | A * | 10/1998 | Davis | H02J 7/0042 320/115 |
| 6,424,842 | B1 * | 7/2002 | Winstead | H01R 13/2442 455/557 |
| 6,860,427 | B1 * | 3/2005 | Schmidt | G02B 26/10 235/462.14 |
| 7,102,328 | B2 * | 9/2006 | Long | B26B 19/3833 320/115 |
| 7,778,023 | B1 * | 8/2010 | Mohoney | G06F 1/1632 312/223.2 |
| 8,662,399 | B2 * | 3/2014 | Vassura | G06K 7/10881 235/375 |
| 9,032,130 | B2 * | 5/2015 | Aldana | H04B 10/801 710/303 |
| 2004/0057199 | A1 * | 3/2004 | Azuchi | G06F 1/1626 361/679.3 |
| 2005/0064762 | A1 * | 3/2005 | Yu | H01R 13/641 439/488 |
| 2007/0002533 | A1 * | 1/2007 | Kogan | B60R 11/0241 361/679.41 |
| 2007/0024576 | A1 * | 2/2007 | Hassan | G06F 1/1632 345/156 |
| 2011/0285765 | A1 * | 11/2011 | Lamontagne | B41J 3/36 347/3 |

* cited by examiner

*Primary Examiner* — Kristy A Haupt
(74) *Attorney, Agent, or Firm* — Yuri Astvatsaturov

(57) ABSTRACT

A battery pack for an electro-optical reader includes a rechargeable battery and a printed circuit board (PCB), both mounted in a battery housing. First and second electrical connectors are supported by the same PCB and/or the battery housing. The first electrical connector is connected to reader contacts in the reader when the battery pack is mounted in the reader. The second electrical connector is either connected to station contacts in a docking station when the reader is docked, or to a recharging cable.

20 Claims, 7 Drawing Sheets

RECHARGEABLE BATTERY PACK FOR AN ELECTRO-OPTICAL READER, AND METHOD OF CHARGING THE BATTERY PACK AND POWERING THE READER WITH THE CHARGED BATTERY PACK

BACKGROUND OF THE INVENTION

The present disclosure relates generally to a rechargeable battery pack for an electro-optical reader, and to a method of electrically charging the battery pack and of electrically powering the reader with the charged battery pack.

Both laser-based and solid-state, imager-based readers, also known as scanners, have been used, in both handheld and/or hands-free modes of operation, to electro-optically read symbol targets, such as one- and/or two-dimensional bar code symbols, to be decoded, as well as document targets, such as forms, labels, receipts, prescriptions, drivers' licenses, identification badges, payment/loyalty cards, and the like, to be imaged. In the hands-free mode, the reader is stationary, and is typically mounted and docked in a docking station, such as a stand or cradle, mounted on a countertop or like support surface. A user typically presents a target to a window of the stationary reader in a presentation mode. In the handheld mode, the reader is movable, and the user typically lifts the reader from the docking station, holds the reader in his or her hand, aims the reader at the target, and manually actuates a trigger to initiate reading.

Many such readers are cordless and, when a reader is removed from its docking station, an on-board, rechargeable battery pack is required to provide electrical power for operation, and to be periodically recharged. The docking station typically has a station contact block on which electrical station contacts are typically supported for recharging the battery pack when the reader is docked, as well as additional electrical station contacts typically used for sending electrical signals, e.g., data and control signals, to and from the reader via the battery pack when the reader is docked. Likewise, the reader typically has a reader contact block on which a pair of electrical reader contacts is typically supported for supplying power from the battery pack to the reader, as well as additional electrical, reader contacts typically used for sending electrical signals, e.g., data and control signals, to and from the reader via the battery pack. The reader contacts and the station contacts are embedded in their respective contact blocks constituted of, for example, plastic, and the reader contacts and the station contacts are exposed on a portion of the respective contact block.

Although the known battery pack is generally satisfactory for its intended purpose of making electro-mechanical connections with the reader contact block in the reader and with the station contact block in the docking station, the known battery pack has proven to be relatively complex in design and assembly. For example, the known battery pack is typically provided with a pair of pack contact blocks to respectively mate with the reader contact block and with the station contact block. The pair of pack contact blocks are mounted on a pair of printed circuit boards (PCBs), each of which has to be separately installed and properly aligned in the battery pack. Each pack contact block itself represents a relatively expensive component to fabricate and install, thereby increasing the complexity and expense of the overall battery pack.

Accordingly, there is a need to make a battery pack for an electro-optical reader less complex and expensive, without sacrificing battery pack performance over its working lifetime.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
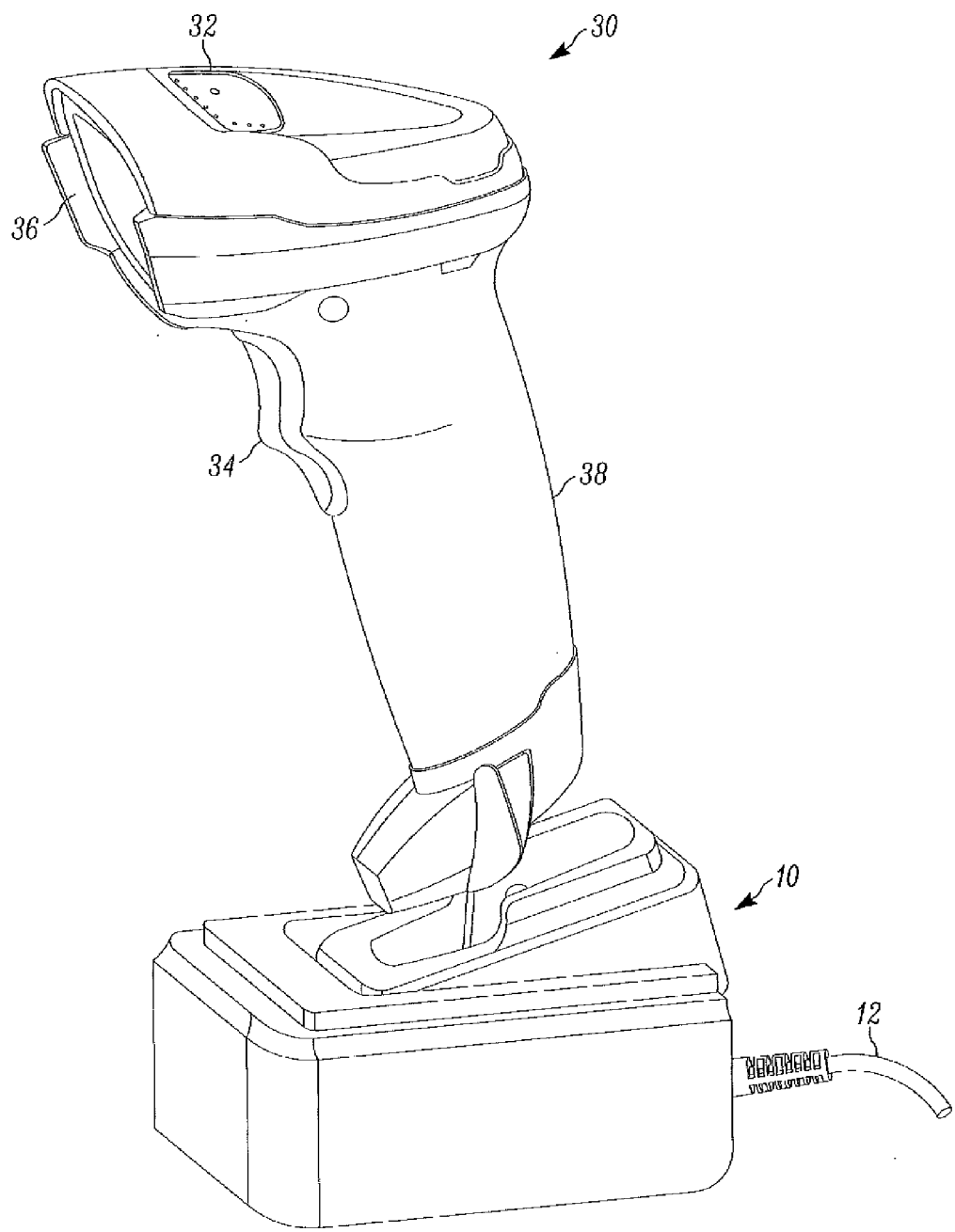
FIG. 1 is an exploded, perspective view of a cordless, electro-optical reader in which a rechargeable battery pack is mounted and recharged in a docking station in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to a rechargeable battery pack for electrically powering an electro-optical reader, either laser-based or imager-based, when the battery pack is mounted in the reader in a mounted position. The battery pack includes a battery housing, a rechargeable battery supported by the battery housing, a printed circuit board (PCB) supported by the battery housing, and first and second electrical connectors, both supported by the same PCB and/or the battery housing and both being operatively connected to the battery. The first electrical connector has a first plurality of electrical contacts connected to the reader in the mounted position. The second electrical connector has a second plurality of electrical contacts connected to an electrical power source for electrically charging the battery pack.

Advantageously, the first plurality of electrical contacts is exposed exteriorly of the battery housing and is in electro-mechanical contact with a corresponding plurality of reader contacts, preferably supported on a reader contact block, in the reader in the mounted position. The second plurality of electrical contacts is likewise exposed exteriorly of the battery housing and is in electro-mechanical contact either with a corresponding plurality of station contacts, preferably supported on a station contact block, in a docking station in which the reader is mounted in a docked position, or is directly connected to the power source with a recharging cable. At least one, or both, of the electrical connectors may be a contact block mounted on the PCB. At least one, or both, of the electrical connectors may be a set of electrically conductive, surface pads on the PCB. At least one or both, of the electrical connectors is a set of electrically conductive, terminals mounted on the battery housing. Preferably, the terminals are molded into the battery housing. At least one, or both, of the electrical connectors, or an additional connector, may be Universal Serial Bus (USB) connectors, preferably of the micro-USB type, for connection to the recharging cable. Any combination of the contact blocks, the surface pads, the molded terminals, and USB connectors can be used with the battery pack.

Another aspect of this disclosure relates to a method of electrically charging a battery pack and of electrically powering an electro-optical reader with the charged battery pack. The method is performed by mounting a rechargeable battery and a printed circuit board (PCB) in a battery housing of the battery pack, by mounting the battery pack in the reader in a mounted position, by supporting a first electrical connector and a second electrical connector by at least one of the same PCB and the battery housing, by connecting the first and second electrical connectors to the battery, by connecting a first plurality of electrical contacts of the first electrical connector to the reader in the mounted position, and by connecting a second plurality of electrical contacts of the second electrical connector to an electrical power source for electrically charging the battery pack.

Hence, it is no longer necessary to provide and install two PCBs, or two contact blocks, in the battery pack. The battery pack is thus less complex and expensive than heretofore, and battery pack performance is not sacrificed over its working lifetime.

Turning now to FIG. 1 of the drawings, reference numeral 30 generally identifies a cordless, electro-optical reader, either laser-based or imager-based, that is ergonomically advantageously configured as a gun-shaped housing having an upper barrel or body 32 and a lower handle 38 extending rearwardly away from the body 32. A window 36 is located adjacent a front or nose of the body 32. The reader 30 is either held by the handle 38 in an operator's hand and used in a handheld mode, as described above, in which a trigger 34 is manually depressed to initiate reading of symbol/document targets in a range of working distances relative to the window 36, and/or is mounted in a presentation cradle or docking station 10 and used in a hands-free mode in which symbol/document targets are presented in a range of working distances relative to the window 36 for reading. A cable 12 is connected to the station 10 to deliver electrical power from an electrical power source to the station 10 and, in turn, to the reader 30, as well as to support bidirectional communications between the docked reader 30 and a remote host (not illustrated) via the station 10.

Figure 2:
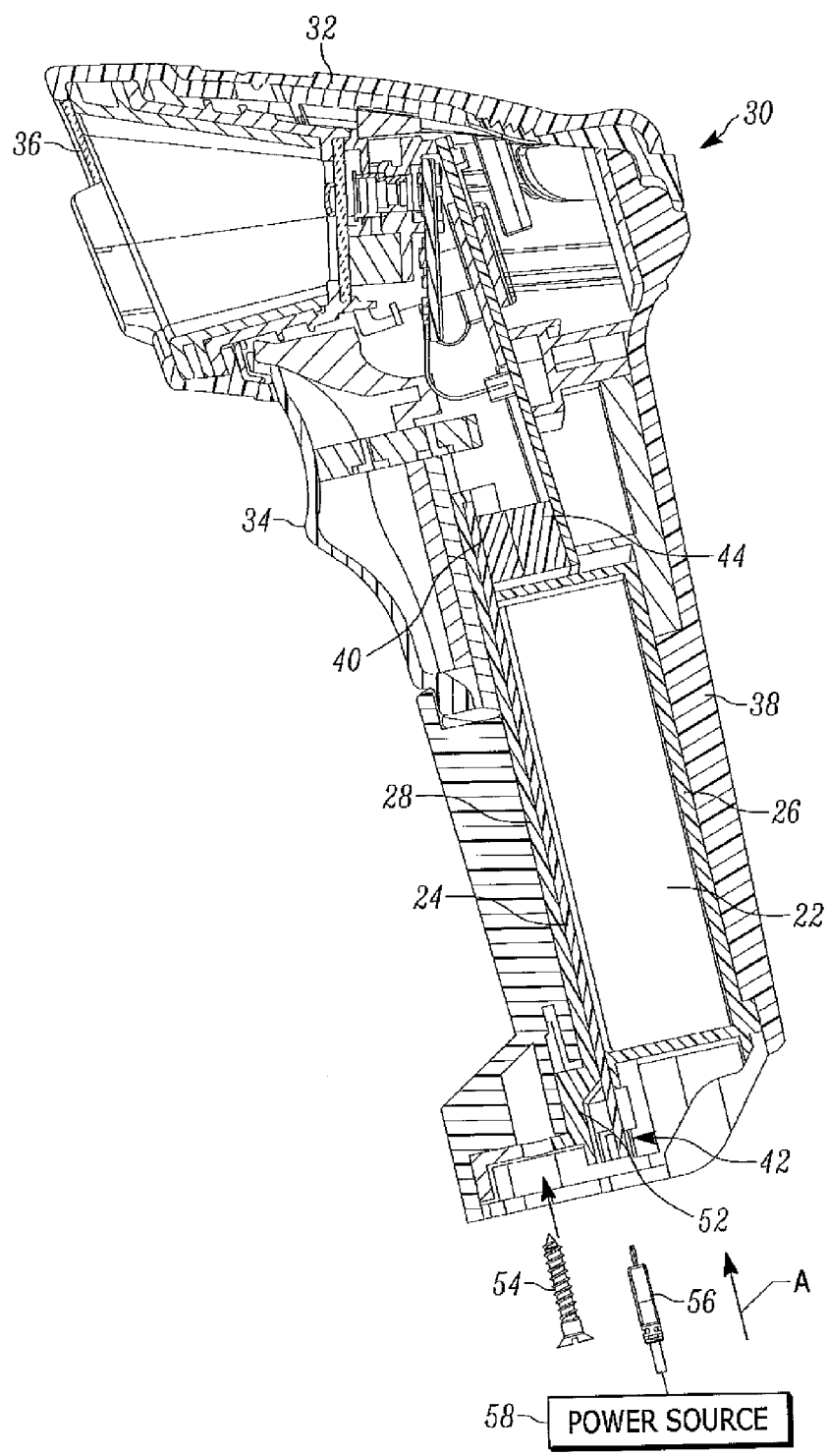
FIG. 2 is a sectional view of the reader of FIG. 1, depicting one embodiment of the battery pack mounted in a handle of the reader, and recharged in either the docking station, or by connection to a recharging cable.
Figure 5:
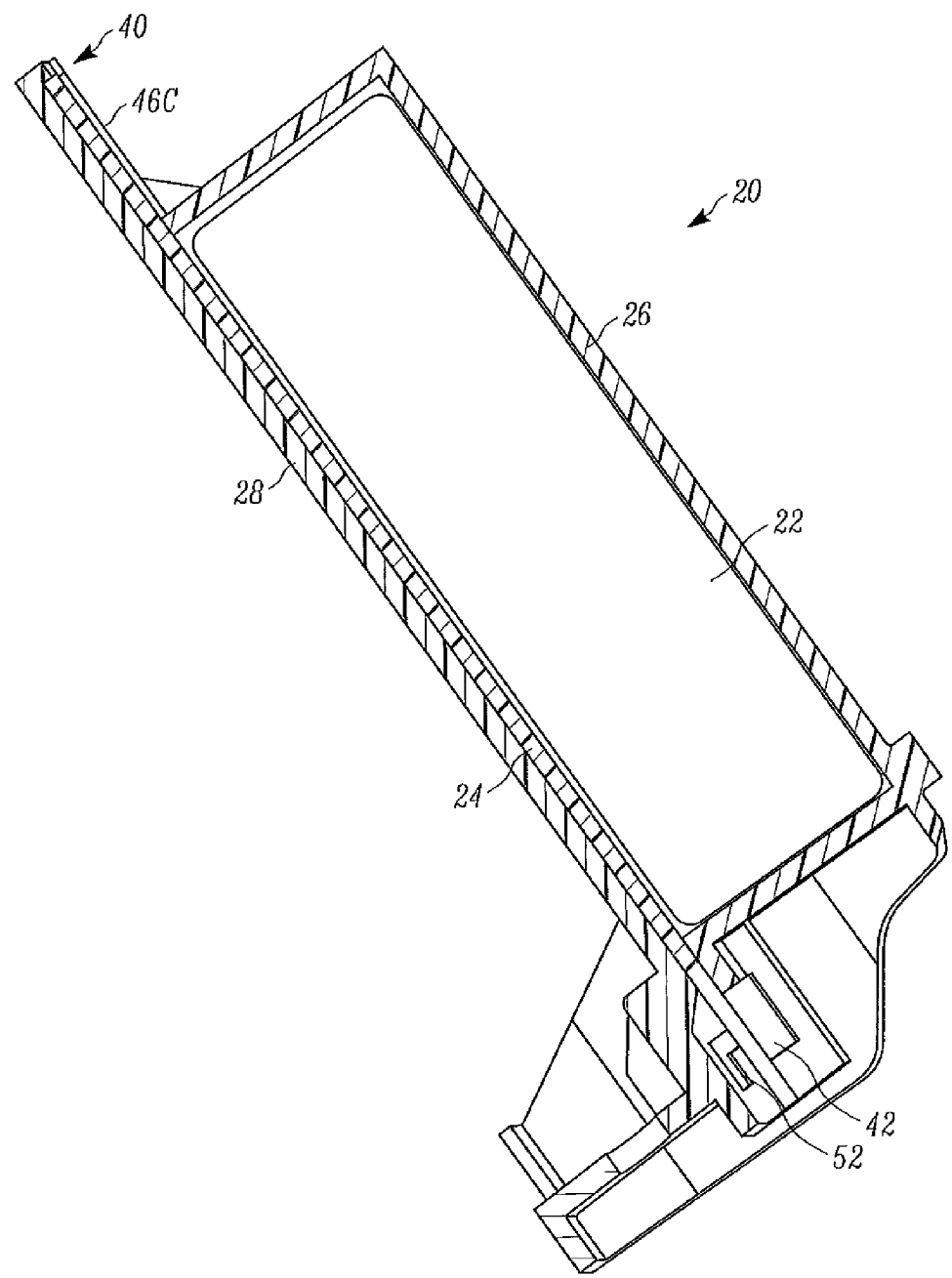
FIG. 5 is an enlarged, sectional view taken on line 5-5 of FIG. 3.

As best seen in FIG. 2, a battery pack 20 is advantageously inserted in the direction of arrow A into an open lower end of the handle 38 and is mounted therein in a mounted position. The battery pack 20 is secured in the mounted position by a threaded fastener 54 that extends through an extension of the handle 38 and threadedly engages a threaded bore in the handle 38. The battery pack 20 is removable from the handle 38 by unthreading the fastener 54 and by moving the battery pack in the direction opposite to arrow A. The battery pack could be mounted in the housing in different ways. For example, the rear side of the handle 38 could be open, and the battery pack could be inserted through the open rear side of the handle, or could be hooked to the handle and pivoted forwardly through the open rear side. As another example, the battery pack need not be mounted inside the handle, but can constitute the handle itself and be connected to the upper barrel 32 to form the gun-shaped housing. As best seen in FIG. 5, the battery pack 20 includes a rechargeable battery 22 and a printed circuit board (PCB) 24, both supported by a battery housing having housing shell portions 26, 28 that bound an interior in which the battery 22 is mounted. The battery housing 26, 28 is elongated and extends lengthwise between opposite leading and trailing end regions along a longitudinal axis (arrow A).

The battery pack 20 also includes a first electrical connector 40 and a second electrical connector 42 located at the opposite end regions of the battery housing 26, 28. As described below, the first electrical connector 40 is supported by either the PCB 24 and/or the battery housing 26, 28 and is operatively connected to the battery 22, and the second electrical connector 42 is likewise supported by either the same PCB 24 and/or the battery housing 26, 28 and is operatively connected to the battery 22. The first electrical connector 40 has a first plurality of electrical contacts, and the second electrical connector 42 likewise has a second plurality of electrical contacts, all of the contacts being exposed exteriorly of the battery housing 26, 28.

When the battery pack 20 is inserted into, or is integrated with, the reader 30 in the mounted position, the battery pack 20 can supply electrical power to electrical components in the reader 30 when the reader is in the handheld mode of operation. The electro-mechanical contact between the first connector 40 and the reader 30 is made by a reader contact block 44 (see FIG. 2) mounted on a PCB within the reader 30. The reader contact block 44 supports a plurality of reader contacts, which mate with the first plurality of electrical contacts of the first connector 40 in the mounted position.

Figure 4:
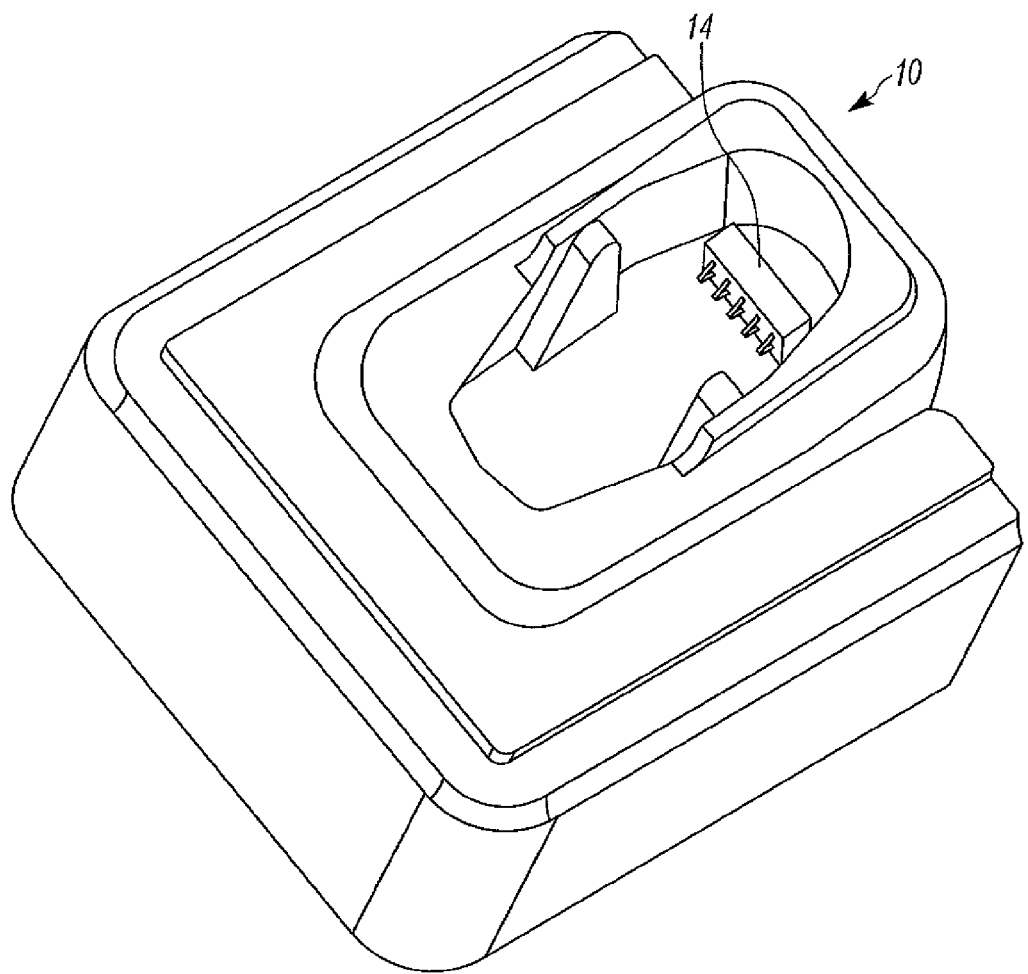
FIG. 4 is a perspective view of the docking station of FIG. 1, as seen from above.

When the battery pack 20 needs to be recharged, the reader 30, with the installed battery pack 20, may advantageously be mounted in the docking station 10 in a docked position. The electro-mechanical contact between the second connector 42 and the station 10 is made by a station contact block 14 (see FIG. 4) mounted on a PCB within the station 10. The station contact block 14 supports a plurality of station contacts, which mate with the second plurality of electrical contacts of the second connector 42 in the docked position. As described below, the recharging need not be performed in the station 10.

Figure 3:
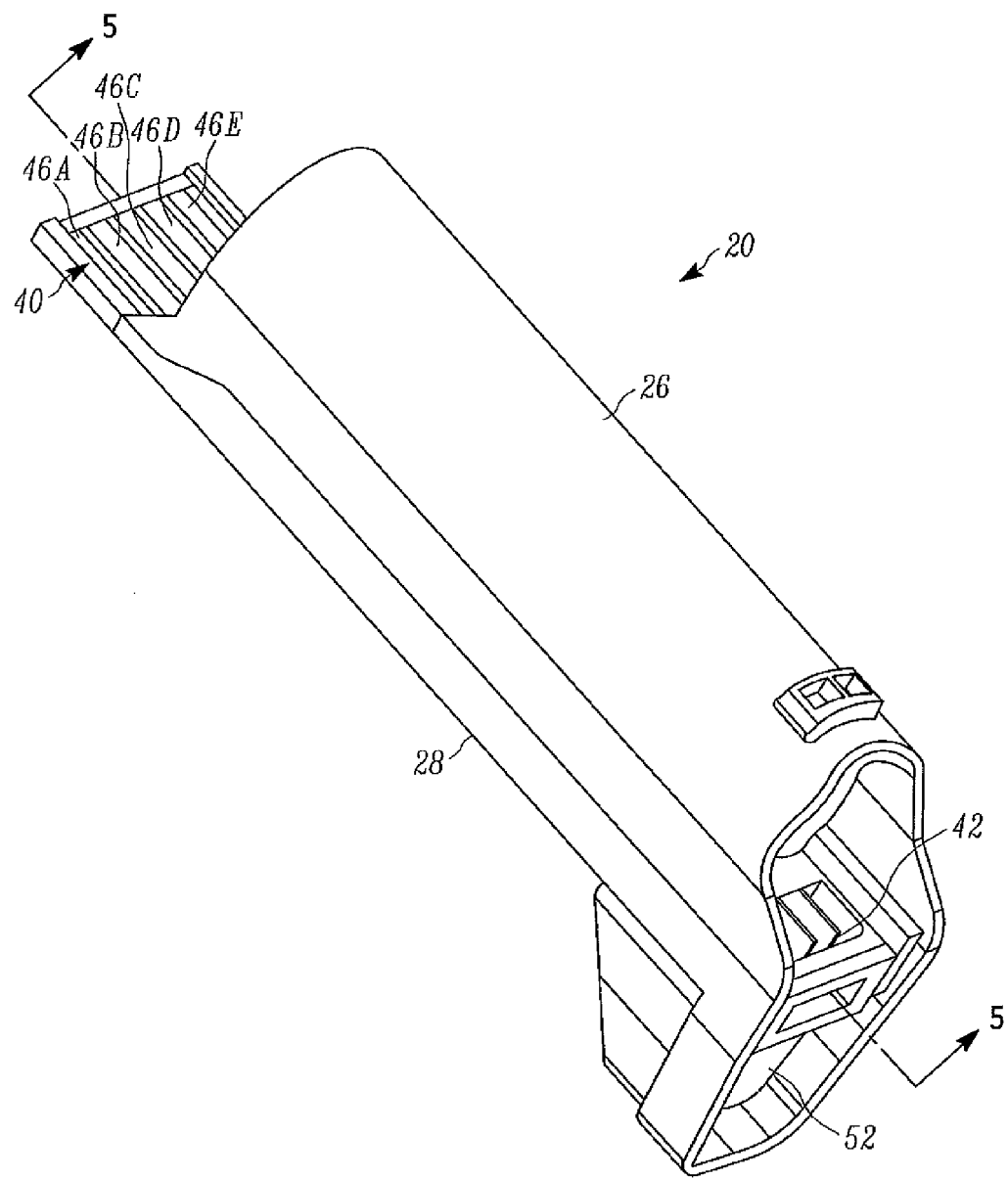
FIG. 3 is an enlarged, perspective view of the battery pack of FIG. 2 in isolation, as seen from below.

The electrical connectors 40, 42 can take a variety of forms. For example, one, or both, of the electrical connectors 40, 42 can be a contact block, such as the contact block identified by numeral 42 in FIGS. 2, 3 and 5 and mounted on the bottom of the PCB 24. The contact block 42 supports the respective plurality of electrical contacts of at least one of the electrical connectors 42, 44. As another example, one, or both, of the electrical connectors 40, 42 can be, as shown in FIG. 3 at the top of the PCB 24, a set of electrically conductive, traces or surface pads 46A-E on the PCB 24. The pads 46A-E are the traces left behind after a copper sheet laminated onto the PCB 24 has been etched. The pads 46A-E constitute the respective plurality of electrical contacts of at least one of the electrical connectors 42, 44. As yet another example, a Universal Serial Bus (USB) connector 52, preferably a micro-USB connector, can be mounted on the same, or, as shown, on the opposite side of, the PCB 28.

The USB connector 52 is connected by a USB cable 56 to an electrical power source 58 for electrically charging the battery pack 20. The USB connector 52 can replace one of the electrical connectors 40, 42, or can be provided as an additional connector. Thus, as described so far, the connectors 40, 42 can both be contact blocks, or can both be surface pads, or can be one of each, or can be supplemented with, or replaced by, the USB connector 52, as illustrated in FIGS. 2, 3 and 5.

Figure 6:
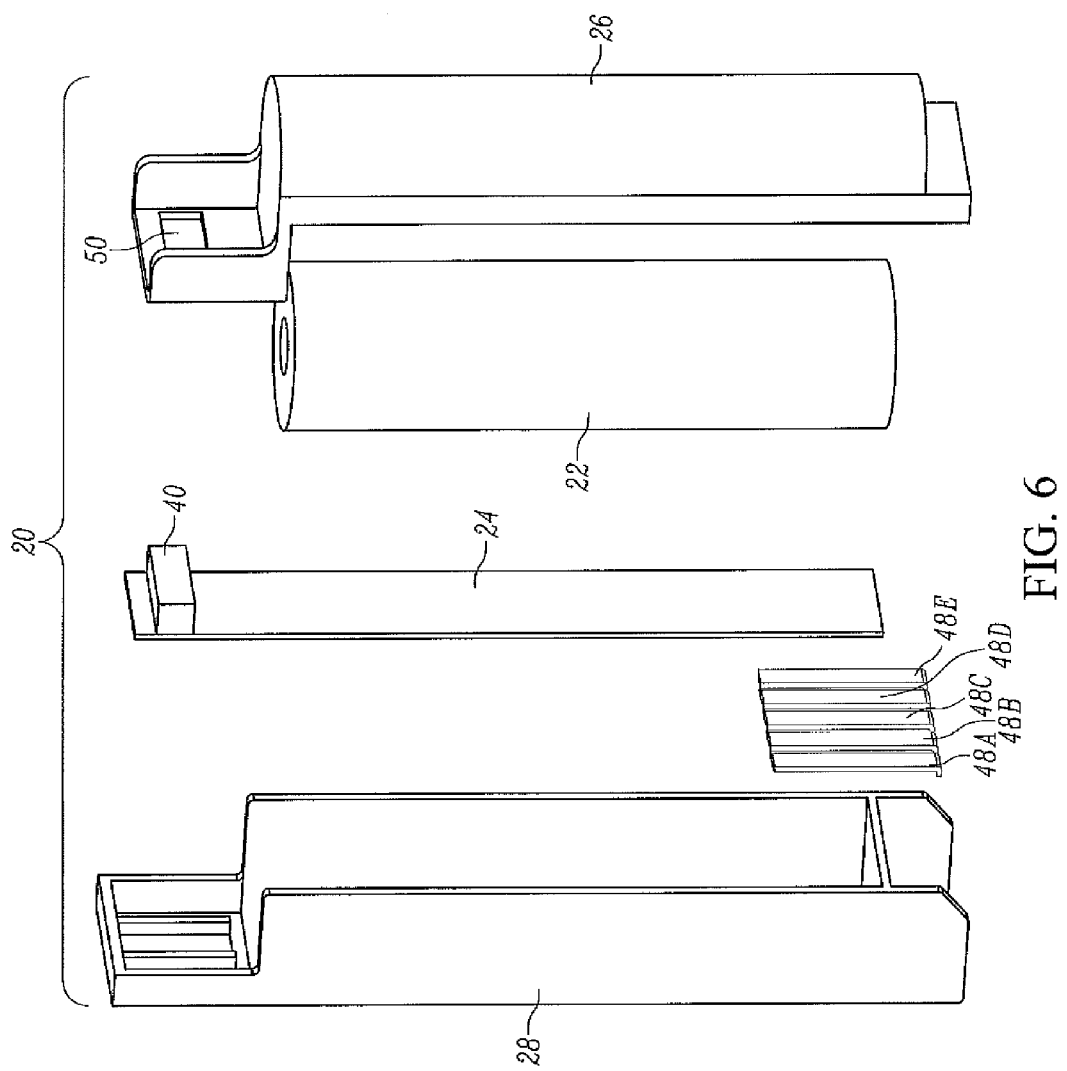
FIG. 6 is an exploded, perspective view of another embodiment of the battery pack in isolation.
Figure 7:
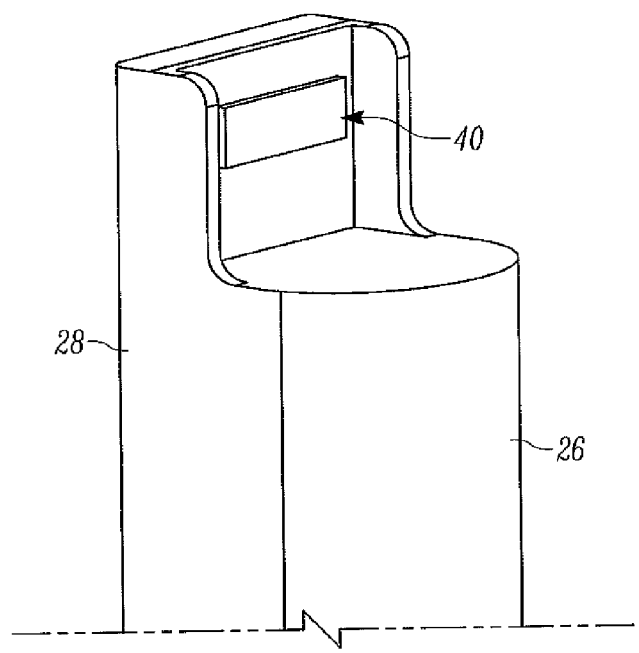
FIG. 7 is a broken-away, perspective view of an upper portion of the battery pack of FIG. 6, as seen from above.
Figure 8:
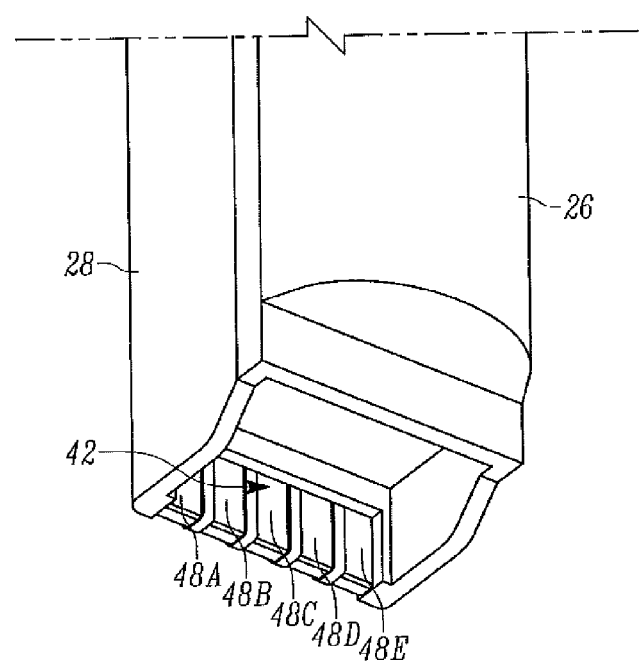
FIG. 8 is a broken-away, perspective view of a lower portion of the battery pack of FIG. 6, as seen from below.

As an additional example, one, or both, of the electrical connectors 40, 42 can be a set of electrically conductive, terminals 48A-E (see FIGS. 6 and 8) mounted on the battery housing 26, 28. As shown in FIGS. 6-8, in a variant construction, the battery pack 20 again includes the rechargeable battery 22 and the PCB 24, both supported by the battery housing having housing shell portions 26, 28 that bound an interior in which the battery 22 is mounted. The aforementioned terminals 48A-E are electrically conductive, metal strips that are molded into the battery housing 26, 28, rather than being mounted on the PCB 24, for increasing the strength of the electro-mechanical connection. The terminals 48A-E constitute the respective plurality of electrical contacts of at least one of the electrical connectors 40, 42. As also shown in FIGS. 6-8, the first connector 40 can be a contact block mounted on the PCB 24. A cutout 50 in the housing portion 26 receives the contact block 40.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a disclosed embodiment. Thus, the following claims are hereby incorporated into the Detailed Description, with each claim standing on its own as a separately claimed subject matter.

The invention claimed is:

1. A rechargeable battery pack for powering an electro-optical reader when the battery pack is mounted in the reader in a mounted position, the battery pack comprising:
   a battery housing;
   a rechargeable battery supported by the battery housing;
   a printed circuit board (PCB) supported by the battery housing;
   a first electrical connector supported by at least one of the PCB and the battery housing and being operatively connected to the battery, the first electrical connector having a first plurality of electrical contacts to be connected to the reader in the mounted position; and a second electrical connector supported by at least one of the same PCB and the housing and being operatively connected to the battery, the second electrical connector having a second plurality of electrical contacts to be connected to an electrical power source for electrically charging the battery pack.

2. The battery pack of claim 1, wherein the first and second electrical connectors are mounted on a common surface of the same PCB.

3. The battery pack of claim 1, wherein the first plurality of electrical contacts is exposed exteriorly of the battery housing and is in electro-mechanical contact with a corresponding plurality of reader contacts in the reader when in the mounted position; and wherein the second plurality of electrical contacts is exposed exteriorly of the battery housing and is in electro-mechanical contact with a corresponding plurality of station contacts in a docking station when the reader is mounted in a docked position.

4. The battery pack of claim 3, wherein the reader contacts are mounted on a reader contact block in the reader, and wherein the station contacts are mounted on a station contact block in the docking station.

5. The battery pack of claim 1, wherein at least one of the first and second electrical connectors is a contact block mounted on the PCB, and wherein the contact block supports the respective plurality of electrical contacts of the at least one of the first and second electrical connectors.

6. The battery pack of claim 1, wherein at least one of the first and second electrical connectors is a set of electrically conductive surface pads on the PCB, and wherein the pads constitute the respective plurality of electrical contacts of the at least one of the first and second electrical connectors.

7. The battery pack of claim 1, wherein at least one of the first and second electrical connectors is a set of electrically conductive terminals mounted on the battery housing, and wherein the terminals constitute the respective plurality of electrical contacts of the at least one of the first and second electrical connectors.

8. The battery pack of claim 1, wherein at least one of the first and second electrical connectors is a Universal Serial Bus (USB) connector connected by a USB cable to the electrical power source for electrically charging the battery pack.

9. The battery pack of claim 1, wherein the reader has a handle, and wherein the battery housing is mounted in the handle and extends between opposite end regions along a longitudinal axis, and wherein the first electrical connector is located at a first one of the opposite end regions of the battery housing and the second electrical connector is located at a second one of the opposite end regions.

10. The battery pack of claim 9, further comprising a fastener to fasten the battery housing to the handle.

11. A method of electrically charging a battery pack and of electrically powering an electro-optical reader with the charged battery pack, the method comprising:
mounting a rechargeable battery and a printed circuit board (PCB) in a battery housing of the battery pack;
mounting the battery pack in the reader in a mounted position;
supporting a first electrical connector and a second electrical connector by at least one of the same PCB and the battery housing;
connecting the first and second electrical connectors to the battery;
wherein mounting the battery pack in the reader in the mounted position comprises connecting a first plurality of electrical contacts of the first electrical connector to the reader in the mounted position; and
wherein supporting the second electrical connector comprises configuring a second plurality of electrical contacts of the second electrical connector to be connected to an electrical power source for electrically charging the battery pack.

12. The method of claim 11, further comprising mounting the first and second electrical connectors on a common surface of the same PCB.

13. The method of claim 11, further comprising exposing the first plurality of electrical contacts exteriorly of the battery housing to make electro-mechanical contact with a corresponding plurality of reader contacts in the reader in the mounted position; and exposing the second plurality of electrical contacts exteriorly of the battery housing to make electro-mechanical contact with a corresponding plurality of station contacts in a docking station when the reader is mounted in a docked position.

14. The method of claim 13, further comprising mounting the reader contacts on a reader contact block in the reader, and mounting the station contacts on a station contact block in the docking station.

15. The method of claim 11, further comprising configuring at least one of the first and second electrical connectors as a contact block mounted on the PCB, and supporting the respective plurality of electrical contacts of the at least one of the first and second electrical connectors on the contact block.

16. The method of claim 11, further comprising configuring at least one of the first and second electrical connectors as a set of electrically conductive surface pads on the PCB, and constituting the pads as the respective plurality of electrical contacts of the at least one of the first and second electrical connectors.

17. The method of claim 11, further comprising configuring at least one of the first and second electrical connectors as a set of electrically conductive terminals mounted on the battery housing, and constituting the terminals as the respective plurality of electrical contacts of the at least one of the first and second electrical connectors.

18. The method of claim 11, further comprising configuring at least one of the first and second electrical connectors as a Universal Serial Bus (USB) connector, and connecting the USB connector by a USB cable to the electrical power source for electrically charging the battery pack.

19. The method of claim 11, further comprising:
configuring the reader with a handle;
mounting the battery housing in the handle;
configuring the battery housing to extend between opposite end regions along a longitudinal axis;
locating the first electrical connector at a first one of the opposite end regions of the battery housing; and
locating the second electrical connector at a second one of the opposite end regions of the battery housing.

20. The method of claim 19, further comprising fastening the battery housing to the handle.

* * * * *